United States Patent [19]

Sackett, Sr.

[11] 4,051,948
[45] Oct. 4, 1977

[54] DUAL CONVEYOR SYSTEM

[75] Inventor: Walter James Sackett, Sr., Severna Park, Md.

[73] Assignee: The A. J. Sackett & Sons Company, Baltimore, Md.

[21] Appl. No.: 747,828

[22] Filed: Dec. 6, 1976

Related U.S. Application Data

[63] Continuation-in-part of Ser. No. 613,909, Sept. 16, 1975, abandoned.

[51] Int. Cl.² .................................................. B65G 47/18
[52] U.S. Cl. .................................... 198/550; 198/616; 198/727; 198/735; 214/44 R
[58] Field of Search ............... 198/366, 370, 550, 557, 198/569, 616, 727, 861, 733–735, 729, 725, 540; 214/44 R

[56] References Cited

U.S. PATENT DOCUMENTS

| | | | |
|---|---|---|---|
| 2,130,492 | 9/1938 | Hapman | 198/727 |
| 2,222,316 | 11/1940 | Maguire et al. | 198/735 |
| 2,357,796 | 9/1944 | Hapman | 198/725 |
| 2,389,279 | 11/1945 | De'Los Sinden | 198/733 |
| 3,589,502 | 6/1971 | Maillet | 198/729 |
| 3,802,584 | 4/1974 | Sackett et al. | 214/44 R |

*Primary Examiner*—Evon C. Blunk
*Assistant Examiner*—Joseph E. Valenza
*Attorney, Agent, or Firm*—Walter G. Finch

[57] ABSTRACT

The invention is an improved conveyor apparatus for unloading bulk material from bulk material transportation systems, such as railcars. The conveyor apparatus is provided with a housing that is waterproof to the atmosphere and tight internally against dust leakage from conveyed materials, the housing enclosing a motor-driven continuous chain having segmented Z-shaped flights attached to the chain. Two different materials can be unloaded by the present apparatus, one such material on each side of the segmented flights. The present apparatus is also capable of conveying bulk material at any angle between 0 and 90° from the point of entry of said material into the apparatus, and between 0° and 45° from the point of entry of the materials into the apparatus when the mixing of dissimilar conveyed materials (i.e. contamination) is to be prevented.

13 Claims, 6 Drawing Figures

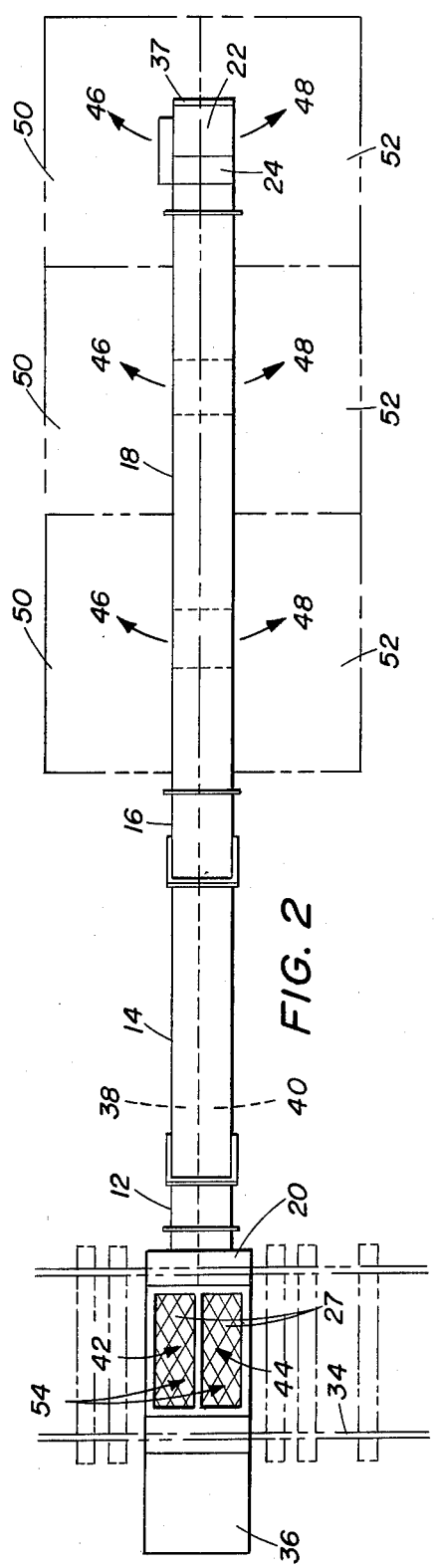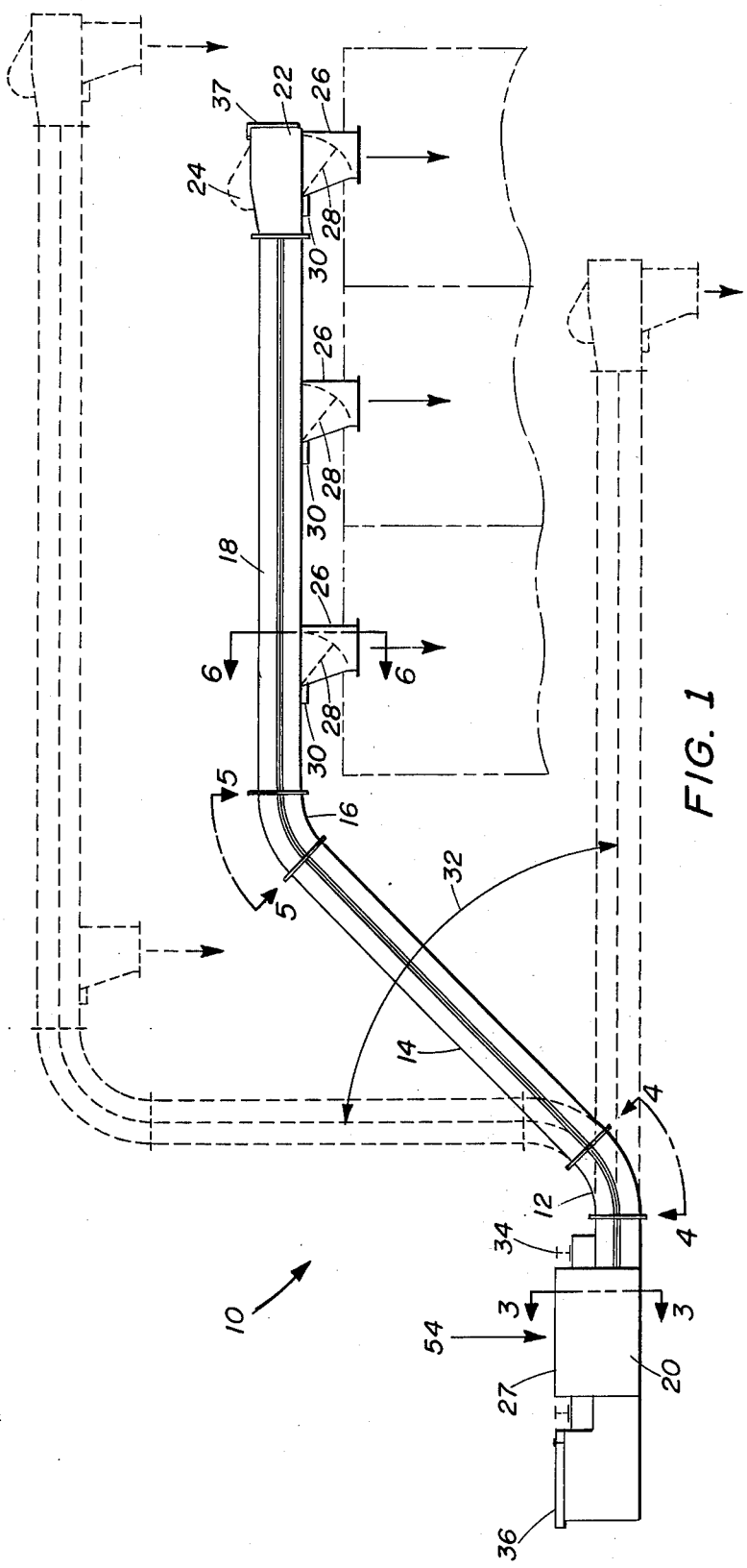

DUAL CONVEYOR SYSTEM

This application is a continuation-in-part of U.S. patent application Ser. No. 613,909, filed by applicant on Sept. 16, 1975, now abandoned, for a "Dual Conveyor System."

BACKGROUND AND SUMMARY OF THE INVENTION

The invention relates to power-driven conveyor systems and in particular to enclosed chain flight conveyor systems for the handling of bulk materials, one such system being disclosed by Sackett et al. in U.S. Pat. No. 3,802,584, of which the present invention is an improvement. The said disclosures of U.S. Pat. No. 3,802,584 are incorporated by reference thereto in this present application.

A need has existed for an enclosed conveyor system which, in addition to being waterproof against outside moisture and eliminating dust nuisances and material losses due to spillage and blow-away, allows movement of large volumes of bulk material either horizontally or at any angle of inclination up to 90°, and up to an angle of inclination of 45° when intermixing of dissimilar conveyed materials is to be prevented. The present invention provides such a conveyor system which has the further capability of discharging material at any number of points along the path of the conveyor. Still further, the present conveyor apparatus is capable of conveying two separate materials within the same housing and discharging said materials into separate storage bins.

It is therefore an object of the invention to provide an enclosed conveyor system capable of moving large volumes of material either horizontally or at any angle of inclination up to 90°, or at an angle of inclination up to 45° where two dissimilar materials are to be conveyed without intermixing.

It is a further object of the invention to provide an enclosed conveyor system comprised of Z-shaped flights driven by a chain, the direction of travel of the chain-driven flights being reversible to and from horizontal travel to inclined travel, and to and from vertical travel.

Another object of this invention is to provide a conveyor system which is environmentally sound and which is efficient and reliable in operational use.

It is another object of the invention to provide an enclosed conveyor system wherein two separate materials can be moved within the enclosed system and discharged therefrom at one or more points along the path of travel into separate material storage bins.

Further objects and advantages of the invention will become more apparent in light of the following description of the preferred embodiments.

BRIEF DESCRIPTION OF THE DRAWINGS

FIG. 1 is an elevation of the present conveyor system illustrating at least three directional conveying modes;
FIG. 2 is a plan view of the system of FIG. 1.

DESCRIPTION OF THE PREFERRED EMBODIMENTS

Figure 5:
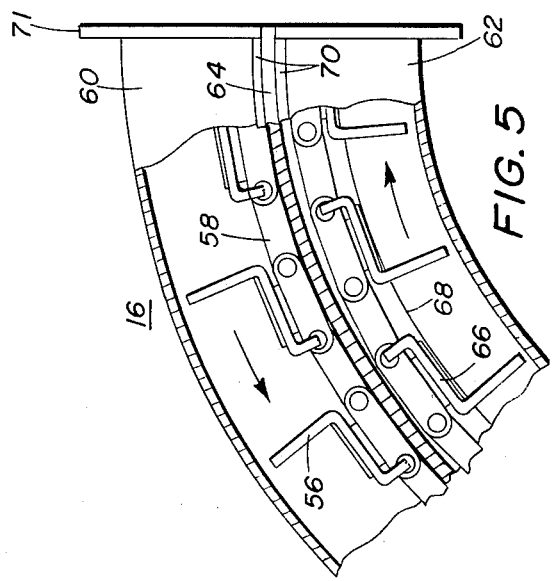
FIG. 5 is a section taken on line 5—5 of FIG. 1.

Referring to the drawings and particularly to FIGS. 1 and 2, an improved bulk material conveyor system is shown at 10 to consist of housing sections 12, 14, 16, and 18, the sections 12 and 16 being curved and the sections 14 and 18 being straight. The curved sections 12 and 16 allow the system 10 to move bulk material in other than a straight horizontal path from an enclosed receiving housing 20.

The section 12 is formed in the manner of a 45° pipe joint, thereby moving the conveyed material in an inclined upward path from the receiving housing 20 and into the straight section 14 for movement to desired level above the housing 20, i.e., at a level above the point where the material was received into the system 10. The curved section 16 is of a reverse curvature relative to that of the section 12, the direction of flow of the conveyed bulk material thereby being changed from an inclined flow path to a horizontal flow path.

The straight section 18 moves the material along in a horizontal direction at the desired elevated level above the receiving housing 20. The housing sections 12, 14, 16, and 18 are waterproof against outside moisture, dust-tight to prevent leakage of dust from conveyed materials to atmosphere, and so designed as hereinafter described so as to prevent intermixing (i.e., contamination) of dissimilar materials being conveyed. As seen particularly in phantom in FIG. 1, the system 10 can be configured to elevate the conveyed material at any angle from the housing 20 from 0° to 90°, i.e., from a horizontal flow path to a 90° vertical flow path as indicated by numeral 32. In this regard, the elevation of two dissimilar materials is secure against intermixing of the materials (i.e., contamination) at angles from 0° to 45° as illustrated by the housing 14 in FIG. 1.

On attainment of the desired elevational level, the conveyed bulk material can be discharged from the housing section 18 through any of several twin discharging ports 26 spaced along the section 18, the bulk material being discharged into receiving bins 50 and 52 in a manner to be more fully described hereinafter. The housing section 18 terminates in a discharge housing 22 which houses an additional twin discharge port 26.

Referring again to FIGS. 1 and 2, it can be seen that the bulk material which is to be conveyed is loaded into the system 10 through the receiving housing 20, the housing 20 having twin input ports 27 disposed in the upper surface thereof. Bulk material is offloaded from a bulk material containing entity, such as a railcar, into the receiving housing 20 through the twin input ports 27.

Figure 3:
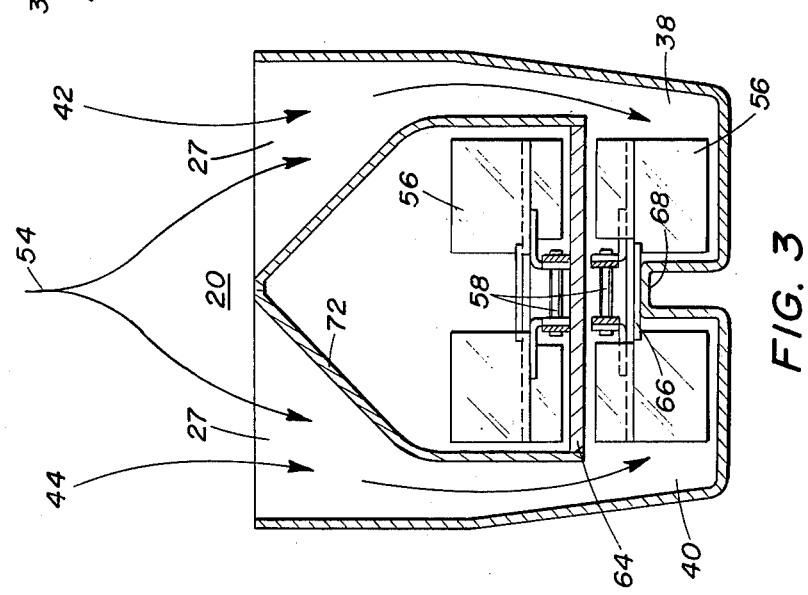
FIG. 3 is a section taken on line 3—3 of FIG. 1.

As particularly seen in FIG. 2, the receiving housing 20 can be disposed either beneath or above rails 34 such as in the unloading of railcars. As seen in FIGS. 2 and 3, bulk material of unlike kind can be received into the receiving housing 20, one kind of such unlike material being received through one of the ports 27 as shown at 42 and the other kind of such material being received through the other port 27 as shown at 44.

It is to be understood, of course, that the same material could be received through both of the ports 27 such as in shown by numeral 54. On entry into the receiving housing 20 through the ports 27, which ports 27 may be covered by screens, the bulk material is shunted to the lower portion of the housing 20 by means of a baffle 72, the baffle 72 surmounting and partially enclosing the conveying assembly to be described in more detail hereinafter.

The bulk material which falls into the lower portion of the housing 20 is picked up by flights 56 of the conveying assembly. The flights 56 are Z-shaped steel plate which are divided into two separate material moving plates, one of the two plates moving in a path 38 on one side of the conveyor system 10 as seen at 38 and the other plate moving about a path 40 on the other side of the system, the paths 38 and 40 being left and right conveyor chamber troughs (respectively) viewed in the direction of movement of the flights 56 in the housing sections such as housing section 14. Thus, each flight 56 can move two different materials simultaneously from the twin receiving housing 20 to one of the twin discharge ports 26, the two different materials being moved by the separate plates comprising the flight 56.

The flights 56 are attached to and are driven throughout the conveyor system 10 by a chain 58, the chain 58 being driven by a motor 24 in a fashion such as is described in the aforementioned incorporated reference Sackett et al patent. The flights 56 are driven around a steel plate 64 which separates the system 10 into upper and lower passageway chambers 60 and 62 and which separates, supports, and guides the chain 58. The housing sections 12, 14, 16, and 18 are thus seen to be comprised of upper and lower shell sections which are attached together by means of flanges 70 along the direction of travel of the system 10, the said sections mating at the junctures thereof by means of flanges 71.

Bulk material, either of the same of different kind, is thus moved through the system 10 by the flights 56, through changes in elevation provided by the curved sections 12 and 16, and to the twin discharge ports 26 and into receiving bins 50 and 52. The material in the path 38 (being the aforementioned left conveyor chamber trough) is discharged into the bins 50 and the material in the path 40 (being the aforementioned right conveyor chamber trough) is discharged into the bins 52 as indicated by numerals 46 and 48.

The lower shell section 62 of the aforementioned upper 60 and lower 62 shell sections is a novel integrally formed unit comprising an indented rail 68 (hereinafter described in detail), left and right conveyor chamber troughs 38 and 40 respectively that form the lower passageway of shell section 62, and the outside enclosing surfaces of the lower shell section 62 which include the exterior longitudinal flanges 70 for connecting to the steel plate 64 and the upper shell section 60. The novel integrally formed unit may be formed monolithically.

Referring again particularly to FIG. 3, it is seen that a wearplate 66 is disposed on the outer portion of each flight 56 between the separate plates of the flight 56. The wear plate 66 rides on an aforementioned indented rail 68 which is integrally formed in the system housing along the full lower travel path thereof and which extends inwardly of said system housing to support the wear plate 66 and to separate the two paths 38 and 40 into the aforementioned left and right conveyor chamber troughs respectively, so that bulk materials of unlike kind in said paths 38 and 40 do not mix, (i.e., contaminate one another).

Thus, the aforementioned indented rail 68 serves the novel triple purpose of separating the passageway of 62 into two conveyor chamber troughs 38 and 40, provides a rail 68 for support and guidance of the flights 56 on chain 58, and by its indented design integrally with the balance of lower shell section 62 serves as an internal stiffener that increases the shear and bending moment capacities when the shell section 62 acts as a beam between its end supports. Thus, by its unique and novel design the combined upper shell 60, the integrally formed triple purpose lower shell 62, and the separating steel plate 64, when assembled from a unit providing ease of field fabrication, total unit strength permitting especially long spans, minimum supports, water proofness, dust tightness, and security against the mixing of dissimilar materials being conveyed, that in such combination are unique in the field of this invention.

Figure 6:
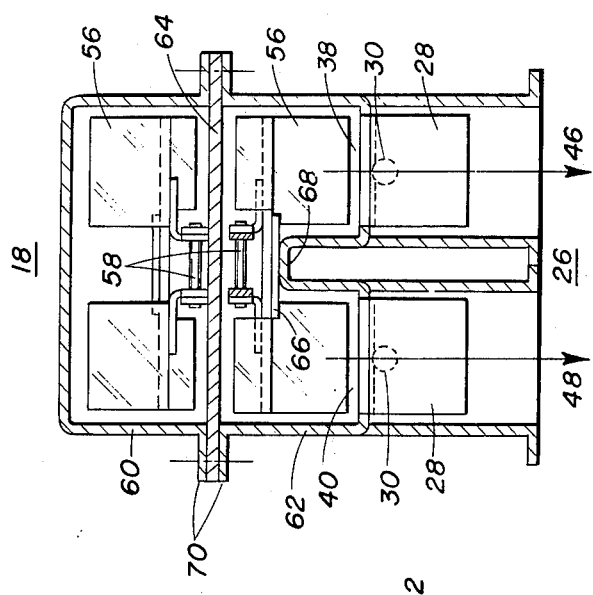
FIG. 6 is a section taken on line 6—6 of FIG. 1.

Referring now to FIG. 6, the twin discharge ports 26 are seen to consist of twin apertures and to be closeable by independent doors 28 openable by independent openers 30. The twin discharge ports 26 can thereby be opened and closed as desired to permit selective discharge of the bulk material at predetermined desired locations along the path of travel of the conveyor system 10.

Figure 4:
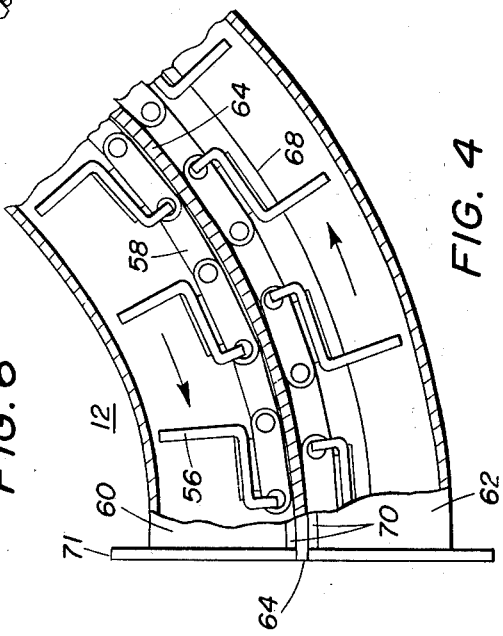
FIG. 4 is a section taken on line 4—4 of FIG. 1.

As can further be seen in FIGS. 4 and 5, the curved housing sections 12 and 16 allow a reversible change in elevation of the path of travel of the system 10. The steel plate 64 which separates the system 10 into the upper and lower chamber 60 and 62 is seen to be curved to follow the contous of the housing sections 12 and 16, the plate 64 being effectively continuous throughout the system 10.

In order to render the mechanism within the receiving and discharge housings 20 and 22 accessible for maintenance and clearing, access doors 36 and 37 are disposed respectively on said housings.

As can be readily understood from the aforegoing description of the invention, the present structure can be configured in different modes to provide the ability to discharge conveyed material at predetermined selected locations along the path of travel thereof. Further, it is seen that the system 10 provides the capability of conveying two bulk materials of unlike kind at the same time without accidental mixing (i.e., contamination) of the materials. Accordingly, modifications and variations which the invention is susceptible to may be practiced without departing from the scope of the appended claims.

What is claimed is:

1. In a bulk material conveyor system having an input end and an output end, a conveyor apparatus which is secure against mixing of dissimilar conveyed materials which are being conveyed simultaneously and which comprises:
   a housing structure formed of a pair of opposed section means;
   a means for separating said pair of opposed section means to form upper and lower passageways;
   a single continuous chain conveyor means disposed centrally within said upper and lower passageways, an upper portion of the said conveyor means being positioned within said upper passageway and being supported by and riding on the upper surface of said means for separating said pair of opposed section means, and a lower portion of said conveyor means being positioned within said lower passageway;
   means for driving said continuous conveyor means;
   a plurality of dual flight means spaced along and carried by said continuous conveyor means;
   bulk materials receiving means disposed at the input of said conveyor system for receiving bulk material, said bulk materials receiving means having separate ports to receive two said dissimilar materials;

separate conveyor chamber trough means in said lower passageway to maintain separation of said dissimilar materials, and in which separate sections of said dual flight means travel; and discharge means at the output end of said conveyor system, having separate ports to said separate conveyor chamber trough means to discharge two said dissimilar materials.

2. The system of claim 1 wherein the said housing structure is formed of a pair of opposed sections means comprising a pair of opposed rectangular half shell sections.

3. The system of claim 1, wherein the said means for separating the said pair of opposed section means is composed of a hardened plate.

4. The system of claim 2 wherein said half shell section forming the lower passageway consists of an integrally formed unit having an indented rail, left and right conveyor chamber troughs, and exterior connecting flanges, the said indented rail, said left and right conveyor chamber troughs, and said exterior connecting flanges extending longitudinally the length of the conveyor apparatus.

5. The conveyor system of claim 4 wherein the said conveyor means is supported by and riding on the said upper surface of the said integrally formed indented rail.

6. The conveyor system of claim 4 wherein each said flight means has a central plate portion surmounting the said chain, the plane of said central plate portion lying parallel to the localized plane of the said means for separating said pair of opposed section means and to the localized plane of the upper surface of the said indented rail, each said flight further having two spaced plate-like members, one each of the plate like members being attached to opposite ends of the central plate portion, the planes of the plate-like members lying perpendicular to the said conveyor chain, one each of the plate-like members extending respectively into and moving within one of the said conveyor chamber troughs formed in the lower passageway, the said plate-like members each engaging and moving material independently within said left and right conveyor chamber troughs.

7. The conveyor system of claim 6 and additionally a planar wear plate means attached to the outer surface of said central plate portion of each of said flights being disposed between said two plate-like members which extend from either side of said central plate portion, the wear plate engaging, being supported by, and moving relative to the upper surface of the indented rail during travel of the chain and attached flights within the lower passageway.

8. The conveyor system of claim 1 wherein the said receiving means is comprised of at least two separate ports, each one of said ports surmounting at least a portion of one of said conveyor chamber troughs, bulk material received into the receiving means through each one of the ports being separately conveyed through one of the conveyor chamber troughs of the lower passageway without admixture or intermixing with bulk material being conveyed within the other of the conveyor chamber troughs, the material within each conveyor chamber trough being moved respectively therein by the said separate plate-like members on the said spaced flights.

9. The system of claim 2 wherein the said housing structure is formed of curved half shell sections and straight half shell sections which mate to provide a conveying path which is angled relative to the horizontal.

10. The system of claim 9 wherein at least two sections of said housing structure are curved so that bulk material can be conveyed to discharge at points along a horizontal line and at a height differing from the other sections of said apparatus.

11. The system of claim 4 wherein the said left and right conveyor chamber troughs are fitted with twin discharge port means disposed at preselected locations along the conveying path of the system and at the output end, to communicate the interior of the said left and right conveyor chamber troughs to the exterior thereof; each of the said twin discharge ports comprising: independent apertures for each of the said left and right conveyor chamber troughs, independent door means removably disposed over each of the said apertures to open and close said apertures, and independent means for moving each said door means from positions covering and uncovering said apertures to allow selective discharge of material therethrough.

12. The system of claim 10 wherein the said curved half shell sections and said stright half shell sections are assembled in combination comprising curved half shell sections not exceeding an incline of 45° in combination with the said straight half shell sections so that inclined assemblies do not exceed 45° to maintain the security against mixing of dissimilar materials in the said separate conveyor chamber troughs so that bulk material can be to discharge at twin discharge points along a horizontal line at heights differing from the input end of the said apparatus.

13. The system of claim 4 wherein the structure of the said integrally formed unit consisting of the indented rail, the left and right conveyor chamber troughs, and the exterior flanges, all in combination with the said upper rectangular half shell, and said means for separating said pair of opposed section means, comprise a structurally strong unit to resist shear and bending movement on long spans with minimum support, and additionally is waterproof to the atmosphere and dust-tight internally.

* * * * *